US012299916B2

United States Patent
Jing et al.

(10) Patent No.: US 12,299,916 B2
(45) Date of Patent: May 13, 2025

(54) THREE-DIMENSIONAL LOCATION PREDICTION FROM IMAGES

(71) Applicant: Waymo LLC, Mountain View, CA (US)

(72) Inventors: Longlong Jing, Mountain View, CA (US); Ruichi Yu, Mountain View, CA (US); Jiyang Gao, Foster City, CA (US); Henrik Kretzschmar, Mountain View, CA (US); Kang Li, Sammamish, WA (US); Ruizhongtai Qi, Mountain View, CA (US); Hang Zhao, Sunnyvale, CA (US); Alper Ayvaci, Santa Clara, CA (US); Xu Chen, Livermore, CA (US); Dillon Cower, Woodinville, WA (US); Congcong Li, Cupertino, CA (US)

(73) Assignee: Waymo LLC, Mountain View, CA (US)

( * ) Notice: Subject to any disclaimer, the term of this patent is extended or adjusted under 35 U.S.C. 154(b) by 447 days.

(21) Appl. No.: 17/545,987

(22) Filed: Dec. 8, 2021

(65) Prior Publication Data

US 2022/0180549 A1     Jun. 9, 2022

Related U.S. Application Data

(60) Provisional application No. 63/122,899, filed on Dec. 8, 2020.

(51) Int. Cl.
*G06T 7/50*     (2017.01)
*G06T 7/70*     (2017.01)
(Continued)

(52) U.S. Cl.
CPC .............. *G06T 7/70* (2017.01); *G06T 7/50* (2017.01); *G06V 10/40* (2022.01); *G06V 10/806* (2022.01);
(Continued)

(58) Field of Classification Search
CPC ......... G01S 17/08; G01S 17/89; G06N 20/00; G06N 3/02; G06N 3/045; G06N 3/08;
(Continued)

(56) References Cited

U.S. PATENT DOCUMENTS 11,409,304 B1 *  8/2022  Cai ........................... B60R 1/00
11,436,743 B2 *  9/2022  Guizilini ................. G06T 7/521
(Continued)

FOREIGN PATENT DOCUMENTS

| CN | 111386550 | 7/2020 |
|---|---|---|
| CN | 111602141 | 8/2020 |
| CN | 111915663 | 11/2020 |

OTHER PUBLICATIONS

Ma, X., Liu, S., Xia, Z., Zhang, H., Zeng, X., & Ouyang, W. (2020). Rethinking Pseudo-LiDAR Representation. arXiv.Org. https://doi.org/10.48550/arxiv.2008.04582 (Year: 2020).*
(Continued)

*Primary Examiner* — Siamak Harandi
*Assistant Examiner* — Caroline Tabancay Duffy
(74) *Attorney, Agent, or Firm* — Fish & Richardson P.C.

(57) ABSTRACT

Methods, systems, and apparatus, including computer programs encoded on computer storage media, for predicting three-dimensional object locations from images. One of the methods includes obtaining a sequence of images that comprises, at each of a plurality of time steps, a respective image that was captured by a camera at the time step; generating, for each image in the sequence, respective pseudo-lidar features of a respective pseudo-lidar representation of a
(Continued)

region in the image that has been determined to depict a first object; generating, for a particular image at a particular time step in the sequence, image patch features of the region in the particular image that has been determined to depict the first object; and generating, from the respective pseudo-lidar features and the image patch features, a prediction that characterizes a location of the first object in a three-dimensional coordinate system at the particular time step in the sequence.

20 Claims, 5 Drawing Sheets

(51) Int. Cl.
*G06V 10/40* (2022.01)
*G06V 10/80* (2022.01)
*G06N 20/00* (2019.01)

(52) U.S. Cl.
CPC .... *G06N 20/00* (2019.01); *G06T 2207/10016* (2013.01); *G06T 2207/20084* (2013.01)

(58) Field of Classification Search
CPC . G06T 2207/10016; G06T 2207/20084; G06T 7/50; G06T 7/70; G06T 7/75; G06T 7/80; G06V 10/40; G06V 10/806; G06V 10/82; G06V 20/647
See application file for complete search history.

(56) References Cited

U.S. PATENT DOCUMENTS

| | | | | |
|---|---|---|---|---|
| 11,927,668 | B2 * | 3/2024 | Fontijne | G06V 20/58 |
| 2015/0254834 | A1 * | 9/2015 | Chandraker | G06T 7/20 |
| | | | | 382/154 |
| 2021/0133461 | A1 * | 5/2021 | Ren | G06T 7/11 |
| 2021/0255304 | A1 * | 8/2021 | Fontijne | G01S 17/931 |
| 2022/0357441 | A1 * | 11/2022 | Ansari | G06N 20/00 |

OTHER PUBLICATIONS

Wang, Y., Chao, W.-L., Garg, D., Hariharan, B., Campbell, M., & Weinberger, K. Q. (2019). Pseudo-LiDAR From Visual Depth Estimation. 2019 IEEE/CVF Conference on Computer Vision and Pattern Recognition (CVPR), 8437-8445. https://doi.org/10.1109/CVPR.2019.00864 (Year: 2019).*
Alhashim et al., "High quality monocular depth estimation via transfer learning," CoRR, Dec. 2018, arXiv:1812.11941, 12 pages.
Beery et al., "Context r-cnn: Long term temporal context for per-camera object detection," Proceedings of the IEEE/CVF Conference on Computer Vision and Pattern Recognition, 2020, pp. 13075-13085.
Behle et al., "Semantickitti: A dataset for semantic scene understanding of lidar sequences," Proceedings of the IEEE International Conference on Computer Vision, Apr. 2, 2019, pp. 9297-9307.
Bewley et al., "Simple online and realtime tracking," IEEE International Conference on Image Processing (ICIP), Sep. 25-28, 2016, pp. 3464-3468.
Brazil et al., "M3d-rpn: Monocular 3d region proposal network for object detection," Proceedings of the IEEE International Conference on Computer Vision, Jul. 13, 2019, pp. 9287-9296.
Caesar et al., "nuscenes: A multimodal dataset for autonomous driving," Proceedings of the IEEE/CVF Conference on Computer Vision and Pattern Recognition, Jun. 1, 2020, pp. 11621-11631.
Cao et al., "Circle marker based distance measurement using a single camera," Lecture Notes on Software Engineering, Nov. 1, 2013, 1(4):376-380.
Chen et al., "Monopair: Monocular 3d object detection using pairwise spatial relationships," Proceedings of the IEEE/CVF Conference on Computer Vision and Pattern Recognition, Jun. 1, 2020, pp. 12093-12102.
Chiu et al., "Probabilistic 3D multi-object tracking for autonomous driving," CoRR, Jan. 16, 2020, arXiv:2001.05673, 8 pages.
Ding et al., "Learning depth-guided convolutions for monocular 3D object detection," Proceedings of the IEEE/CVF Conference on Computer Vision and Pattern Recognition Workshops, Jun. 14, 2020, pp. 1000-1001.
Dosovitskiy et al., "Flownet: Learning optical flow with convolutional networks," Proceedings of the IEEE international conference on computer vision, 2015, pp. 2758-2766.
Eigen et al., "Depth map prediction from a single image using a multi-scale deep network," Advances in neural information processing systems, 2014, pp. 2366-2374.
Fadadu et al., "SMulti-view fusion of sensor data for improved perception and prediction in autonomous driving," Proceedings of the IEEE/CVF Winter Conference on Applications of Computer Vision (WACV), 2022, pp. 2349-2357.
Feichtenhofer et al., "Convolutional two-stream network fusion for video action recognition," Proceedings of the IEEE conference on computer vision and pattern recognition, 2016, pp. 1933-1941.
Feng et al., "A new distance detection algorithm for images in deflecting angle," 2016 2nd IEEE International Conference on Computer and Communications (ICCC), Oct. 2016, pp. 746-750.
Fu et al., "Deep ordinal regression network for monocular depth estimation," Proceedings of the IEEE Conference on Computer Vision and Pattern Recognition, 2018, pp. 2002-2011.
Geiger et al., "Vision meets robotics: The KITTI dataset," The International Journal of Robotics Research, 2013, 32(11):1231-1237.
Godard et al., "Digging into self-supervised monocular depth estimation," Proceedings of the IEEE/CVF International Conference on Computer Vision (ICCV), 2019, pp. 3828-3838.
Godard et al., "Unsupervised monocular depth estimation with left-right consistency," Proceedings of the IEEE Conference on Computer Vision and Pattern Recognition, 2017, pp. 270-279.
Gokce et al., "Vision-based detection and distance estimation of micro unmanned aerial vehicles," Sensors, 2015,15(9):23805-23846.
Guizilini et al., "Semantically-guided representation learning for self-supervised monocular depth," CoRR, Feb. 27, 2020, arXiv:2002.12319, 14 pages.
Hazirbas et al., "Fusenet: Incorporating depth into semantic segmentation via fusion-based cnn architecture," Asian conference on computer vision, Mar. 10, 2017, pp. 213-228.
He et al., "Deep residual learning for image recognition," Proceedings of the IEEE Conference on Computer Vision and Pattern Recognition, 2016, pp. 770-778.
Hu et al., "Joint monocular 3d vehicle detection and tracking," Proceedings of the IEEE international conference on computer vision, 2019, pp. 5390-5399.
Hung et al., "SoDA: Multi-object tracking with soft data association," CoRR, Aug. 18, 2020, arXiv:2008.07725, 13 pages.
Huo et al., "Learning depth-guided convolutions for monocular 3D object detection," 2020 IEEE/CVF Conference on Computer Vision and Pattern Recognition Workshops (CVPRW), 2020, pp. 4306-4315.
Jorgensen et al., "Monocular 3D object detection and box fitting trained end-toend using intersection-over-union loss," CoRR, Jun. 19, 2019, arXiv:1906.08070, 10 pages.
Lang et al., "Pointpillars: Fast encoders for object detection from point clouds," Proceedings of the IEEE Conference on Computer Vision and Pattern Recognition, 2019, pp. 12697-12705.
Li et al., "Rtm3d: Real-time monocular 3d detection from object keypoints for autonomous driving," CoRR, Jan. 10, 2020, arXiv:2001.03343, 11 pages.
Liang et al., "Deep continuous fusion for multi-sensor 3D object detection," Proceedings of the European Conference on Computer Vision (ECCV), 2018, pp. 641-656.

(56) References Cited

OTHER PUBLICATIONS

Liang et al., "Multi-task multi-sensor fusion for 3d object detection," Proceedings of the IEEE Conference on Computer Vision and Pattern Recognition, 2019, pp. 7345-7353.

Liu et al., "Flownet3D: Learning scene flow in 3D point clouds," Proceedings of the IEEE Conference on Computer Vision and Pattern Recognition, 2019, pp. 529-537.

Liu et al., "Looking fast and slow: Memoryguided mobile video object detection," CoRR, Mar. 25, 2019, arXiv:1903.10172, 10 pages.

Liu et al., "Smoke: Singlestage monocular 3D object detection via keypoint estimation," Proceedings of the IEEE/CVF Conference on Computer Vision and Pattern Recognition Workshops, 2020, pp. 996-997.

Luo et al., "Every pixel counts++: Joint learning of geometry and motion with 3D holistic understanding," IEEE Transactions on Pattern Analysis and Machine Intelligence, Oct. 1, 2020, 42(10):2624-2641.

Ma et al., "Accurate monocular 3D object detection via color-embedded 3D reconstruction for autonomous driving," Proceedings of the IEEE/CVF International Conference on Computer Vision (ICCV), 2019, pp. 6851-6860.

Ma et al., "Rethinking pseudo-lidar representation," CoRR, Aug. 11, 2020, arXiv:2008.04582, 21 pages.

Poggi et al., "On the uncertainty of self-supervised monocular depth estimation," Proceedings of the IEEE/CVF Conference on Computer Vision and Pattern Recognition (CVPR), 2020, pp. 3227-3237.

Qi et al., "Frustum pointnets for 3D object detection from RGB-D Data," Proceedings of the IEEE conference on computer vision and pattern recognition, 2018, pp. 918-927.

Rezaei et al., "Robust vehicle detection and distance estimation under challenging lighting conditions," IEEE Transactions on Intelligent Transportation Systems, Oct. 5, 2015, 16(5):2723-2743.

Roberts et al., "Accurate marker based distance measurement with single camera," 2015 International Conference on Image and Vision Computing New Zealand (IVCNZ), Nov. 23-24, 2015, 6 pages.

Simonelli et al., "Disentangling monocular 3D object detection," Proceedings of the IEEE International Conference on Computer Vision, 2019, pp. 1991-1999.

Simonyan et al., "Two-stream convolutional networks for action recognition in videos," Advances in Neural Information Processing Systems 27, 2014, 9 pages.

Sun et al., "Scalability in perception for autonomous driving: Waymo open dataset," Proceedings of the IEEE/CVF Conference on Computer Vision and Pattern Recognition (CVPR), 2020, pp. 2446-2454.

Tuohy et al., "Distance determination for an automobile environment using inverse perspective mapping in openCV," IET Irish Signals and Systems Conference (ISSC 2010), Jun. 23-24, 2010, 6 pages.

Vianney et al., "Refinedmpl: Refined monocular pseudolidar for 3D object detection in autonomous driving," CoRR, Nov. 21, 2019, arXiv:1911.09712, 10 pages.

Vora et al., "Pointpainting: Sequential fusion for 3D object detection," Proceedings of the IEEE/CVF Conference on Computer Vision and Pattern Recognition, 2020, pp. 4604-4612.

Wang et al., "Centernet3d: An anchor free object detector for autonomous driving," CoRR, Jul. 13, 2020, arXiv:2007.07214, 13 pages.

Wang et al., "Pseudo-LiDAR from visual depth estimation: Bridging the gap in 3D object detection for autonomous driving," Proceedings of the IEEE/CVF Conference on Computer Vision and Pattern. Recognition (CVPR), 2019, pp. 8445-8453.

Wang et al., "Task-aware monocular depth estimation for 3D object detection," AAAI-20 Technical Tracks 7, Apr. 3, 2020, 34(7):12257-12264.

Wang et al., "Towards real-time multi-object tracking," CoRR, Sep. 27, 2019, arXiv:1909.12605, 17 pages.

Weng et al., "3D multi-object tracking: A baseline and new evaluation metrics," CoRR, Jul. 9, 2019, arXiv:1907.03961, 9 pages.

Weng et al., "GNN3DMOT: Graph neural network for 3D multi-object tracking with 2D-3D multi-feature learning," Proceedings of the IEEE/CVF Conference on Computer Vision and Pattern Recognition, 2020, pp. 6499-6508.

Weng et al., "Monocular 3D object detection with pseudo-LiDAR point cloud," Proceedings of the IEEE/CVF International Conference on Computer Vision (ICCV), 2019, pp. 0-0.

Xiao et al., "Audiovisual slowfast networks for video recognition," CoRR, Jan. 23, 2020, arXiv:2001.08740, 14 pages.

Yang et al., "RadarNet: Exploiting radar for robust perception of dynamic objects," CoRR, Jul. 28, 2020, arXiv:2007.14366, 16 pages.

Yin et al., "Centerbased 3D object detection and tracking," CoRR, Jun. 19, 2020, arXiv:2006.11275, 12 pages.

Zhang et al., "FairMot: On the fairness of detection and re-identification in multiple object tracking," CoRR, Apr. 4, 2020, arXiv:2004.01888, 19 pages.

Zhou et al., "Objects as Points," CoRR, Apr. 16, 2019, arXiv:1904.07850, 12 pages.

Zhou et al., "Tracking objects as points," Computer Vision—ECCV, Aug. 21, 2020, pp. 474-490.

Zhu et al., "Flow-guided feature aggregation for video object detection," Proceedings of the IEEE International Conference on Computer Vision, 2017, pp. 408-417.

Zhu et al., "Learning object-specific distance from a monocular image," Proceedings of the IEEE International Conference on Computer Vision, 2019, pp. 3839-3848.

Office Action in Chinese Appln. No. 202111493822.4, dated May 31, 2024, 16 pages (with English translation).

\* cited by examiner

THREE-DIMENSIONAL LOCATION PREDICTION FROM IMAGES

CROSS-REFERENCE TO RELATED APPLICATION

This application claims priority to U.S. Provisional Application No. 63/122,899, filed on Dec. 8, 2020. The disclosure of the prior application is considered part of and is incorporated by reference in the disclosure of this application.

BACKGROUND

This specification relates to predicting the location of an object in an environment. The environment may be a real-world environment, and the object may be, e.g., a vehicle or other object in the environment. For example, the prediction may be made by an autonomous vehicle. Autonomous vehicles include self-driving cars, boats, and aircraft. Autonomous vehicles use a variety of on-board sensors and computer systems to detect nearby objects and use such detections to make control and navigation decisions.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that generates a three-dimensional location prediction for an object that has been detected in one or more images.

The location prediction is referred to as a "three-dimensional" location prediction because it incorporates the depth of the object, i.e., the distance of the object from the sensor that captured the one or more images or from another point. This is in contrast to a "two-dimensional" location prediction, which only identifies the region of an image that depicts the object.

Determining the three-dimensional location of objects in an environment is an important problem for many tasks. For example, autonomous vehicles use one or more sensors to sense objects in the vicinity of the autonomous vehicle. Determining three-dimensional locations of sensed objects can assist the autonomous vehicle in safely making fully-autonomous driving decisions or providing semi-autonomous driving assistance to a human driver.

However, while some sensors, e.g., lidar sensors, can accurately measure the distance from the sensor to the objects sensed by the sensor, some autonomous vehicles may not be equipped with such sensors. Even when the vehicles are equipped with such sensors, distance measurements may not be available for all objects in a given scene, e.g., if the object is outside the range of the sensor, if the sensor is malfunctioning, if the object is occluded from the sensor, or if the sensor is not able to sense the object for another reason.

Thus, when the autonomous vehicle does not have a sensor that can accurately measure the distance or when distance measurements from such a sensor are not available, determining the three-dimensional location of objects directly from camera images, i.e., without relying on measurements from other sensors, can be crucial for the operation of the autonomous vehicle.

However, camera images are two-dimensional representations of the scene captured in the image. That is, the camera images only provide intensity values for each pixel in a two-dimensional grid and do not directly include any three-dimensional information. Thus, determining the three-dimensional location of objects directly from camera images is a challenging problem.

Some systems attempt to predict three-dimensional locations of objects depicted in a given image by generating a dense depth map of the given image. A dense depth map assigns a predicted depth value to each pixel of the given image, so that the depth value for a given pixel represents a predicted three-dimensional distance, i.e., depth, from the camera that captured the given image to the portion of the scene depicted at that given pixel. These systems then directly use the depth maps to estimate the distance of objects, e.g., by determining that the three-dimensional distance to the object is the predicted depth value of the pixels in the region of the image that corresponds to the object. However, because accurately estimating the depth of each pixel in an image is difficult, these dense depth maps are noisy and the resulting object depths can be inaccurate.

This specification describes techniques for accurately estimating per-object depth of objects detected in camera images using both initial, dense depth estimates and image features that are extracted from the camera images. In other words, the system described in this specification generates the three-dimensional location prediction using a combination of "pseudo-lidar" features that are computed using initial depth estimates and image patch features that are computed directly from the intensity values of the pixels in the camera image. The pseudo-lidar features are referred to as "pseudo-lidar" because they are generated from a pseudo-lidar representation that represents some or all of the pixels in a camera image as three-dimensional points using the initial depth estimate for the image, akin to a point cloud that would be generated from measurements by a lidar sensor.

By generating the prediction using the combined features, the disclosed system can estimate the three-dimensional location accurately using only one or more camera images. More specifically, the disclosed system can use the image patch features to enhance the initial depth estimate, resulting in a more accurate location prediction than could be generated directly from the initial depth estimates.

In some cases, the disclosed system generates the pseudo-lidar features using a single image. In some other cases, the disclosed system incorporates information from multiple camera images taken at different times when generating the pseudo-lidar features. By incorporating multiple camera images, the system can further increase the accuracy of the three-dimensional location predictions. For example, using multiple camera images allows the disclosed system to account for the fact that a single 2D view of a scene, i.e., the view that is depicted in a single image, can be explained by many plausible 3D scenes.

Figure 1A:
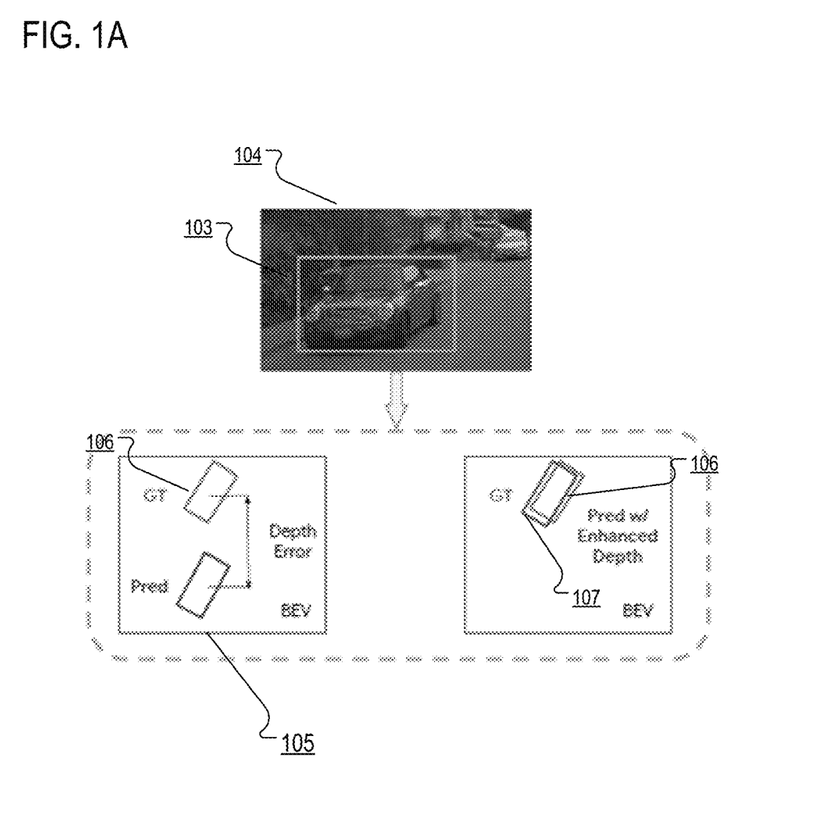
FIG. 1A is an illustration of generating a location prediction for an example object in an image.

FIG. 1A is an illustration of generating a location prediction for an example object 103 in an image 104. As can be seen in FIG. 1A, the image 104 is a perspective view image and the depth of the object 103, i.e., the distance of the object 103 from the camera that captured the image 103, is not directly available from the image 104.

For ease of illustration, various location predictions for the example object 103 are shown as respective bounding boxes in a bird's eye view (BEV) coordinate system. That is, although the location predictions described above specify the three-dimensional location of objects, the location predictions are shown in a two-dimensional BEV coordinate system that shows the depth of the object, but does not show the elevation of the object.

More specifically, the example of FIG. 1A shows a conventional location prediction 105 relative to a ground truth bounding box 106 that represents the actual three-dimensional location of the object 103 when the image 104 was captured. For example, the conventional location prediction 105 can be generated using a conventional monocular 3D detection technique that attempts to generate the prediction directly from the image 104. For example, the conventional technique can generate a depth map that assigns a predicted depth to each pixel of the image and then map a two-dimensional bounding box to a three-dimensional bounding box using the predicted depths.

As can be seen from the example of FIG. 1A, there is a significant error between the conventional location prediction 105 and the ground truth bounding box 106. More specifically, the error can be primarily attributed to a depth error—while the conventional technique relatively accurately predicted the size, shape, and orientation of the object 103, the conventional technique did not accurately predict the depth of the object 103. In particular, because the image 104 is a two-dimensional representation of the environment while object depth is a three-dimensional property, it can be difficult for conventional techniques to generate a representation of the image 104 from which depth can be accurately estimated. For example, directly estimating the depth of each pixel in the image from the two-dimensional image can be error-prone.

The example of FIG. 1A also shows a location prediction 107 for the same object 103 that is generated using the techniques described in this specification, e.g., as would be generated by an on-board system 110 that will be described in more detail below with reference to FIG. 1B. As can be seen from the example of FIG. 1A, there is not a significant error between the location prediction 107 and the ground truth bounding box 106. In particular, unlike the conventional location prediction 105, the location prediction 107 generated by the system 110 accurately predicts the depth of the object. This is because, as described in more detail below, the system 110 enhances an initial depth prediction for the image 104 using both image features and pseudo-lidar features that are generated using the initial depth prediction. By incorporating both types of features, the system 110 generates an object depth prediction that significantly improves over the initial depth prediction. Therefore, the location prediction 107 is significantly more accurate than the conventional location prediction 105.

Figure 1B:
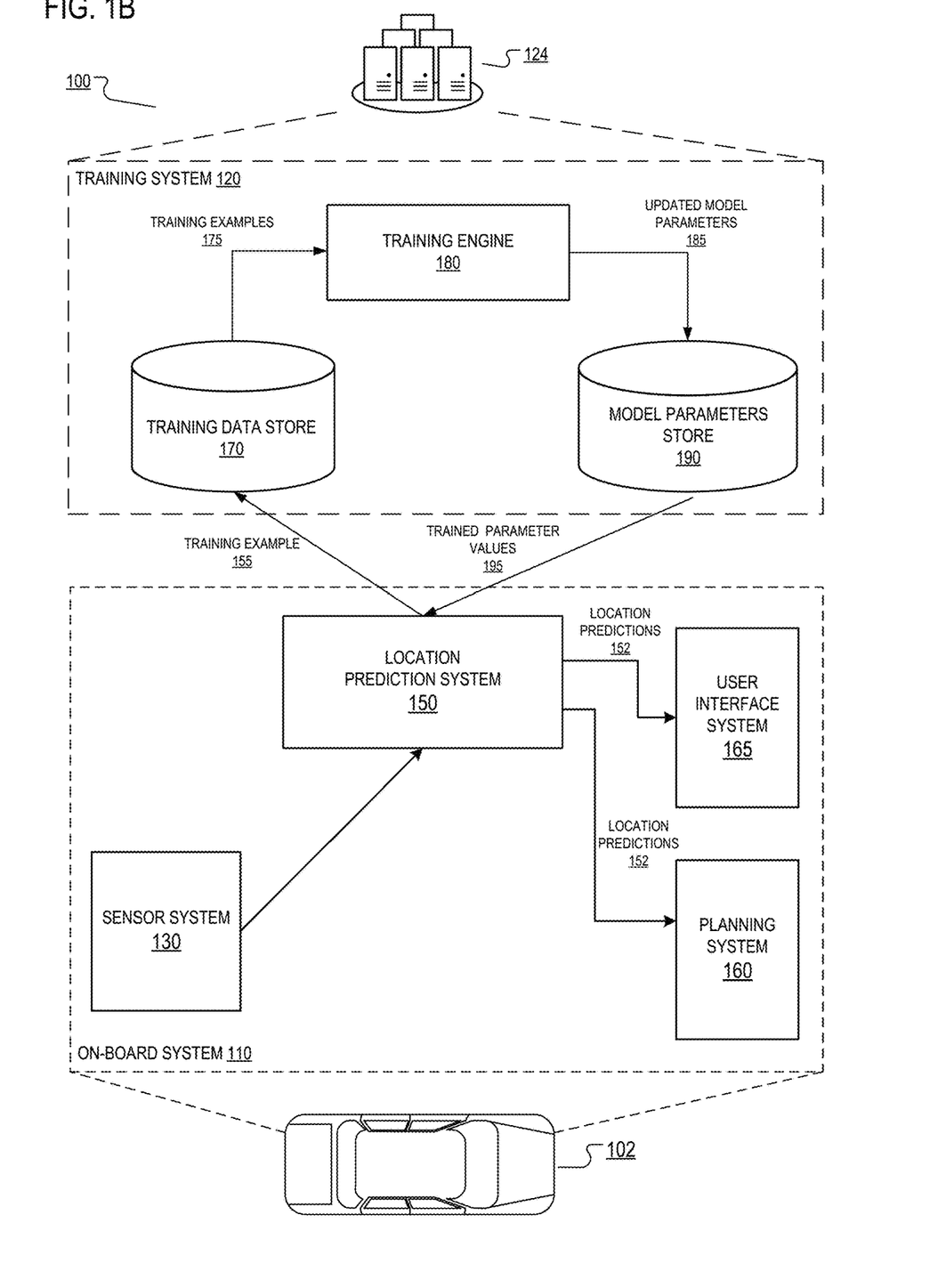
FIG. 1B is a diagram of an example system.

FIG. 1B is a diagram of an example system 100. The system 100 includes the on-board system 110 and a training system 120.

The on-board system 110 is located on-board a vehicle 102. The vehicle 102 in FIG. 1B is illustrated as an automobile, but the on-board system 102 can be located on-board any appropriate vehicle type. In some cases, the vehicle 102 is an autonomous vehicle. An autonomous vehicle can be a fully autonomous vehicle that determines and executes fully-autonomous driving decisions in order to navigate through an environment. An autonomous vehicle can also be a semi-autonomous vehicle that uses predictions to aid a human driver. For example, the vehicle 102 can autonomously apply the brakes if a prediction indicates that a human driver is about to collide with another vehicle. As another example, the vehicle 102 can have an advanced driver assistance system (ADAS) that assists a human driver of the vehicle 102 in driving the vehicle 102 by detecting potentially unsafe situations and alerting the human driver or otherwise responding to the unsafe situation. As a particular example, the vehicle 120 can alert the driver of the vehicle 102 or take an autonomous driving action when an obstacle is detected, when the vehicle departs from a driving lane, or when an object is detected in a blind spot of the human driver.

The on-board system 110 includes one or more sensor subsystems 130. The sensor subsystems 130 include a camera sensor, which generates camera images by detecting reflection of visible light, and can include other sensors, e.g., lidar systems that detect reflections of laser light, radar systems that detect reflections of radio waves, and so on. As the vehicle 102 navigates through the environment, various sensors capture measurements of the environment. For example, a camera sensor can repeatedly capture images during the navigation.

The sensor subsystems 130 or other components of the vehicle 102 can also classify portions of sensor measurements from one or more sensors as being measures of objects in the environment around the vehicle 102.

For example, the subsystems 130 or other components can perform object detection on images captured by a camera sensor to identify regions of the images that depict objects. The subsystems 130 or other components can use any of a variety of two-dimensional object detection techniques.

As a particular example, the subsystems 130 can process the images captured by the camera sensor using an object detection neural network to generate an object detection output for each image that includes a respective set of bounding boxes, where each bounding box in a given image depicts a respective object, i.e., encloses a portion of the given image that the subsystems 130 have determined depicts an object.

In some implementations, the subsystems 130 can then apply an object tracker to the bounding boxes in a temporal sequence of images, i.e., a sequence that is ordered according to the time at which each image was captured, to generate object tracklet data for one or more objects. The object tracklet data for a given object identifies a respective bounding box for the given object in each of the sequence of images that that depicts the given object. That is, the object tracklet data for the given object identifies which of the bounding boxes in each image depicts the given object. For example, the subsystems 130 can apply a Kalman-Filter based object tracker to the object detection outputs for the images in the sequence to generate the object tracklet data. As another example, the subsystems 130 can apply an object tracking neural network to the object detection outputs for the images in the sequence to generate the object tracklet data.

Once the sensor subsystems 130 generate the object detection outputs, the sensor subsystems 130 can send the sequence of images, the object detection outputs and, when used, the object tracklet data to a location prediction system 150, also on-board the vehicle 102.

The location prediction system 150 processes the images, the object detection outputs and, when used, the object tracklet data to generate a respective location prediction output 152 for each of one or more of the objects that have been detected in the one or more images.

When the location prediction system 150 operates on a temporal sequence of multiple images, the respective location prediction output 152 for a given object is a prediction that characterizes a location of the given object in a three-dimensional coordinate system at a particular time step, e.g., the last time step, in the temporal sequence. In some implementations, the three-dimensional coordinate system is a coordinate system centered at a particular location of the autonomous vehicle 102, e.g., at the location of the camera sensor that captured the temporal sequence or at a different fixed location on the autonomous vehicle. For example, the prediction may be a prediction of the depth of the object relative to the camera at the last time step in the temporal sequence of images. In particular, the depth prediction is a predicted depth value that represents a distance of a specified point on the object, e.g., the center of the object, from the camera at the time step. As another example, the prediction may be a prediction of a three-dimensional region in the three-dimensional coordinate system that corresponds to a predicted location of the object at the last time step relative to the camera.

In accordance with some embodiments, generating the location prediction outputs 152 when the system 150 operates on a sequence of images is described in more detail below with reference to FIGS. 2 and 3.

When the location prediction system 150 operates on a single image captured at a particular time step, the respective location prediction output 152 for a given object is a prediction that characterizes a location of the given object in the three-dimensional coordinate system at the particular time step. For example, the prediction may be a prediction of the depth of the given object relative to the camera at the particular time step. In particular, the depth prediction is a predicted depth value that represents a distance of a specified point on the object, e.g., the center of the object, from the camera at the particular time step. As another example, the prediction may be a prediction of a three-dimensional region in the three-dimensional coordinate system that corresponds to a predicted location of the given object at the last time step relative to the camera.

Generating the location prediction outputs 152 when the system 150 operates on a single image is described in more detail below with reference to FIG. 4 in accordance with some embodiments.

The on-board system 110 also includes a planning system 160. The planning system 160 can make autonomous or semi-autonomous driving decisions for the vehicle 102, e.g., by generating a planned vehicle path that characterizes a path that the vehicle 102 will take in the future.

The on-board system 100 can provide the location prediction outputs 152 generated by the location prediction system 150 to one or more other on-board systems of the vehicle 102, e.g., the planning system 160 and/or a user interface system 165.

When the planning system 160 receives the location prediction outputs 152, the planning system 160 can use the location prediction outputs 152 to generate planning decisions that plan a future trajectory of the vehicle, i.e., to generate a new planned vehicle path. For example, the location prediction outputs 152 may contain a prediction that a location of a given object in the environment intersects with a currently planned path for the vehicle 102, potentially causing a collision. In this example, the planning system 160 can generate a new planned vehicle path that avoids the potential collision and cause the vehicle 102 to follow the new planned path, e.g., by autonomously controlling the steering of the vehicle, and avoid the potential collision.

When the user interface system 165 receives the location prediction outputs 152, the user interface system 165 can use the location prediction outputs 152 to present information to the driver of the vehicle 102 to assist the driver in operating the vehicle 102 safely. The user interface system 165 can present information to the driver of the agent 102 by any appropriate means, for example, by an audio message transmitted through a speaker system of the vehicle 102 or by alerts displayed on a visual display system in the agent (e.g., an LCD display on the dashboard of the vehicle 102). In a particular example, the location prediction outputs 152 may contain a prediction that a particular object is within a threshold distance of the vehicle 102, potentially causing a collision. In this example, the user interface system 165 can present an alert message to the driver of the vehicle 102 with instructions to adjust the trajectory of the vehicle 102 to avoid a collision or notifying the driver of the vehicle 102 that a collision with the particular surrounding agent is likely.

To generate the location prediction outputs 152, the location prediction system 150 can use trained parameter values 195, i.e., trained model parameter values of a set of neural networks used by the location prediction system 150, obtained from a model parameters store 190 in the training system 120.

The training system 120 is typically hosted within a data center 124, which can be a distributed computing system having hundreds or thousands of computers in one or more locations.

The training system 120 includes a training data store 170 that stores the training data used to train the location prediction system i.e., to determine the trained parameter values 195 of the machine learning models used by the location prediction system 150. The training data store 170 receives raw training examples from vehicles operating in the real world. For example, the training data store 170 can receive a raw training example 155 from the vehicle 102 and one or more other agents that are in communication with the training system 120. The raw training example 155 can be processed by the training system 120 to generate a new training example. The raw training example 155 can include object detection data, e.g., like the object detection data 142, that can be used as input for a new training example. The raw training example 155 can also include ground truth data characterizing the locations of objects in the environment surrounding the vehicle 102 at the one or more future time points. This data can be used to generate ground truth location outputs for one or more objects in the vicinity of the vehicle at the time point characterized by the object detection data. Each ground truth location output characterizes the actual three-dimensional location of a corresponding object. For example, the ground truth location output can identify the depth of the corresponding object relative to the camera. As another example, the ground truth location output can identify the three-dimensional region occupied by the corresponding object.

The training data store 170 provides training examples 175 to a training engine 180, also hosted in the training system 120. The training engine 180 uses the training examples 175 to update model parameters that will be used by the location prediction system 150, and provides the updated model parameters 185 to the model parameters store

190. Once the parameter values of the location prediction system 150 have been fully trained, the training system 120 can send the trained parameter values 195 to the location prediction system 150, e.g., through a wired or wireless connection.

Training the location prediction system 150 is described in more detail below.

While this specification describes that location predictions are generated on-board an autonomous vehicle, more generally, the described techniques can be implemented on any system of one or more computers that receives images of scenes in an environment.

As one example, the location predictions can be made on-board a different type of agent that has a camera sensor and that interacts with objects as it navigates through an environment. For example, the location predictions can be made by one or more computers embedded within a robot or other agent.

As another example, the location predictions can be made by one or more computers that are remote from the agent and that receive images captured by the camera sensor of the agent. In some of these examples, the one or more computers can use the location predictions to generate control decisions for controlling the agent and then provide the control decisions to the agent for execution by the agent.

As another example, the location predictions may be made in a computer simulation of a real-world environment being navigated through by a simulated autonomous vehicle and the target agents. Generating these predictions in simulation may assist in controlling the simulated vehicle and in testing the realism of certain situations encountered in the simulation. More generally, generating these predictions in simulation can be part of testing the control software of a real-world autonomous vehicle before the software is deployed on-board the autonomous vehicle, of training one or more machine learning models that will later be deployed on-board the autonomous vehicle or both.

Figure 2:
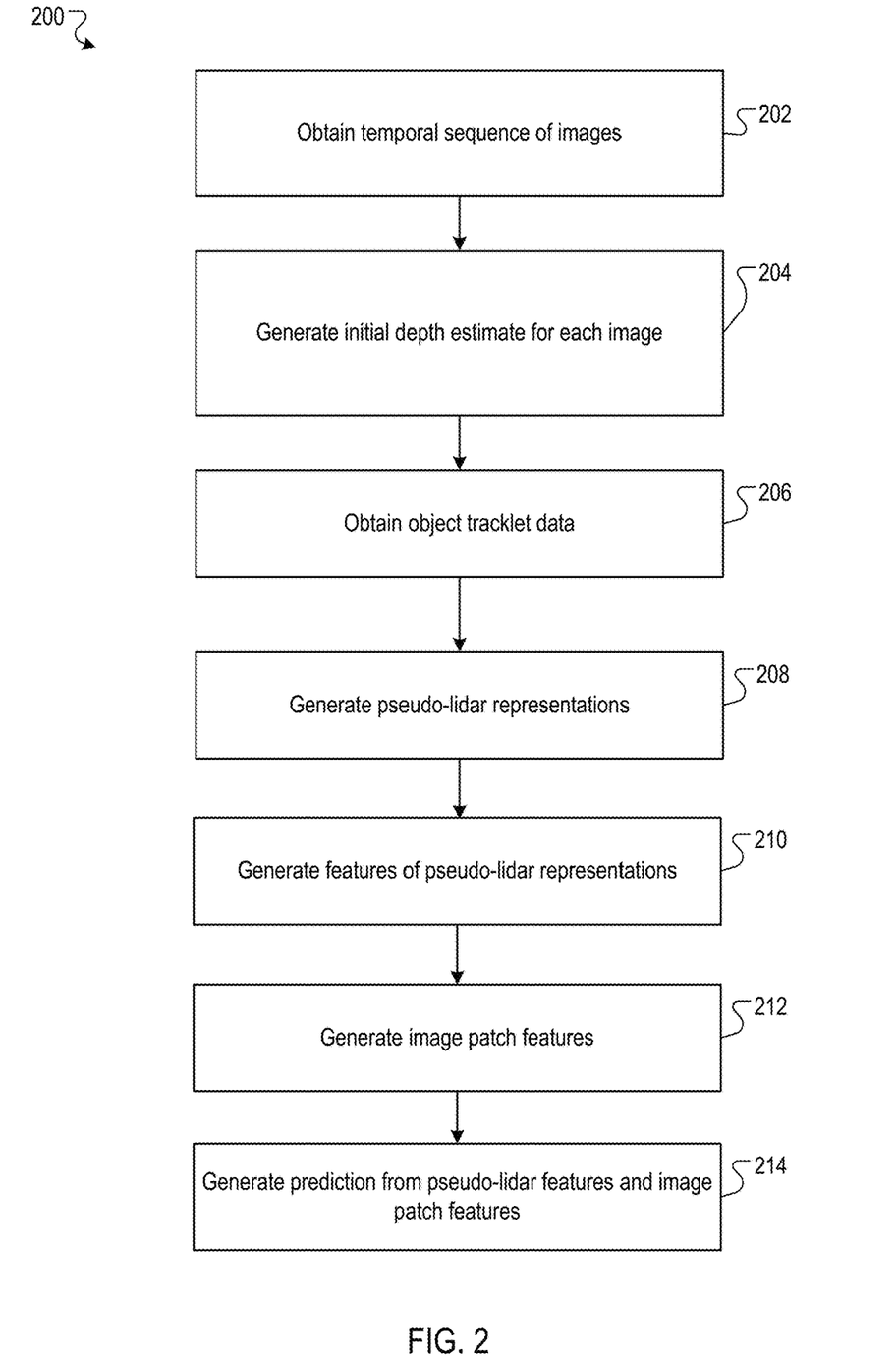
FIG. 2 is a flow diagram of an example process for generating a location prediction output.

FIG. 2 is a flow diagram of an example process 200 for generating a location prediction output for an object. For convenience, the process 200 will be described as being performed by a system of one or more computers located in one or more locations. For example, a location prediction system, e.g., the location prediction system 150 of FIG. 1B, appropriately programmed in accordance with this specification, can perform the process 200.

At any given time point, the system can perform the process 200 to generate a respective location prediction for each of one or more objects that are detected in a temporal sequence of images that are captured by a camera sensor of the vehicle.

The system obtains a temporal sequence of images that includes multiple images (step 202). The sequence is referred to as a "temporal" sequence because, in some implementations, the images are arranged according to the time at which they were captured (i.e., timestamp). For example, the most recent image is the last image in a temporal sequence of images captured by a camera sensor and the least recent image is the first image in the temporal sequence.

The system generates an initial depth estimate for each image in the temporal sequence (step 204). The initial depth estimate for each image in the temporal sequence assigns a respective estimated depth value to each pixel in the image. The respective estimated depth value for a given pixel represents a predicted distance of the scene depicted at that pixel from the camera that captured the image.

To generate an initial depth estimate for a given image, the system can process the given image using a depth estimation neural network. The depth estimation neural network can be, for example, a convolutional neural network that processes the image to generate a depth map that assigns a respective estimated depth value for each pixel of the image. In some implementations, the system obtains a pre-trained depth estimation neural network. In some other implementations, the system jointly trains the depth estimation neural network with the other neural networks that are used to generate the location predictions.

The system can then perform steps 206-214 for each of one or more objects that have been detected in the sequence of images.

The system obtains object tracklet data for the object (step 206). The object tracklet data for the object identifies, for each of the images in the temporal sequence, a region in the image that has been determined to depict the given object. For example, each region can be a two-dimensional bounding box. The tracklet data can be generated by applying a two-dimensional object detector as described above with reference to FIG. 1B.

The system generates, for each image in the temporal sequence, a respective pseudo-lidar representation of the region in the image from the initial depth estimate for the image (step 208).

The pseudo-lidar representation of a given region in a given image represents each pixel that is within the region in the given image as a point in a three-dimensional coordinate system. That is, the system uses the initial depth estimates to transfer the two-dimensional pixels in the given region into the three-dimensional coordinate system.

In particular, to generate the pseudo-lidar representation of a given region, the system maps each pixel that is within the two-dimensional region to a three-dimensional coordinate system based on the estimated depth value for the pixel in the initial depth estimate for the image and properties of the camera.

As a particular example, the system can perform the mapping using the horizontal and vertical focal lengths of the camera and the pixel location corresponding to the camera center. In some implementations, the pixel value at location (u, v) in a given image is mapped to a three-dimensional point (x, y, z) in the three-dimensional coordinate system as follows:

$$z=d(u, v),$$

$$x=(u-C_x)\times z/f_x, \text{ and}$$

$$y=(v-C_y)\times z/f_y,$$

where d(u, v) is the initial depth estimate for the pixel at location (u, v), $f_x$ is the horizontal focal length, $f_y$ is the vertical focal length, and ($C_x$, $C_y$) is the pixel location corresponding to the camera center.

Optionally, the system can also compensate for the ego-motion of the camera as the temporal sequence of images are captured when generating the pseudo-lidar representations. For example, the system can generate initial pseudo-lidar representations as described above and then transform each initial pseudo-lidar representation into the coordinate system of the camera as of the last image in the sequence using the ego-motion of the camera between the images in the sequence.

As a particular example, the system can first project each initial pseudo-lidar representation into a global coordinate system using the ego-motion of the camera and then project the representations from the global coordinate system into the coordinate system of the camera as of the last image.

The system generates, for each pseudo-lidar representation, respective features of the pseudo-lidar representation (step 210). For example, the system can generate the features by processing the pseudo-lidar representation using a pseudo-lidar feature extraction neural network that generates the image pseudo-lidar features as output. The pseudo-lidar feature extraction neural network can be any appropriate neural network that is configured to process a collection of three-dimensional points, e.g., the encoder neural network of any appropriate 3D object detection neural network. For example, the neural network can be a convolutional neural network that arranges the points as an image and processes the image to generate the features. An example of such a neural network is a PatchNet, which is described in more detail in Ma, et al, Rethinking Pseudo-LiDAR Representation, arXiv:2008.04582.

The system generates image patch features of the region in an image at a particular time step in the temporal sequence (step 212). For example, the image at the particular time step can be the last image, i.e., the most recent image, in the temporal sequence. More generally, however, the particular time step can be any of the time steps in the temporal sequence.

For example, the system can process the image at the particular time step in the sequence using an image feature extraction neural network to generate image features for the image. The system can then select, as the image patch features, a subset of the image features that correspond to a patch of the image that is within the region. That is, the system can generate the image patch features by cropping the portion of the image features that corresponds to the region. The feature extraction neural network can be, e.g., a convolutional encoder neural network that maps images to feature maps. One example of a convolutional neural network that can be used is a ResNet backbone neural network that includes multiple residual convolutional blocks. Another example of a convolutional neural network that can be used is an EfficientNet backbone neural network.

The system generates, from the respective pseudo-lidar features and the image patch features, a prediction that characterizes a location of the object in the three-dimensional coordinate system at the particular time step in the temporal sequence (step 214).

As a particular example, the system can combine the respective pseudo-lidar features and the image patch features to generate combined features and process the combined features using a decoder neural network to generate the prediction.

In some implementations, the system generates the combined features by concatenating the respective pseudo-lidar features and the image patch features. Thus, in these implementations, the input to the decoder neural network is a concatenation of respective pseudo-lidar features for each region and the image patch features for the image at the particular time step in the temporal sequence.

In some other implementations, the system first generates combined pseudo-lidar features by combining the respective pseudo-lidar features for the images in the sequence. For example, the system can process the respective pseudo-lidar features through a feedforward neural network, e.g., a multilayer perceptron (MLP), or can concatenate or average the respective pseudo-lidar features. The system then combines, e.g., concatenates the combined pseudo-lidar features and the image patch features. Thus, in these implementations, the input to the decoder neural network is a concatenation of the combined pseudo-lidar features and the image patch features for the image in the temporal sequence.

The decoder neural network can have any appropriate architecture that allows the decoder neural network to map a set of features to the prediction.

For example, the decoder neural network can be a multilayer perceptron (MLP) neural network that processes the combined features to generate the prediction. When the prediction is a depth estimate for the object, the output of the decoder neural network can be a single regressed depth value that represents the predicted depth for the object. When the prediction specifies a three-dimensional region that corresponds to a predicted location of the object at the particular time step, the output of the decoder neural network can be regressed values for each of a set of coordinates that define the three-dimensional region, e.g., the coordinates for a three-dimensional bounding box, in the three-dimensional coordinate system.

Figure 3:
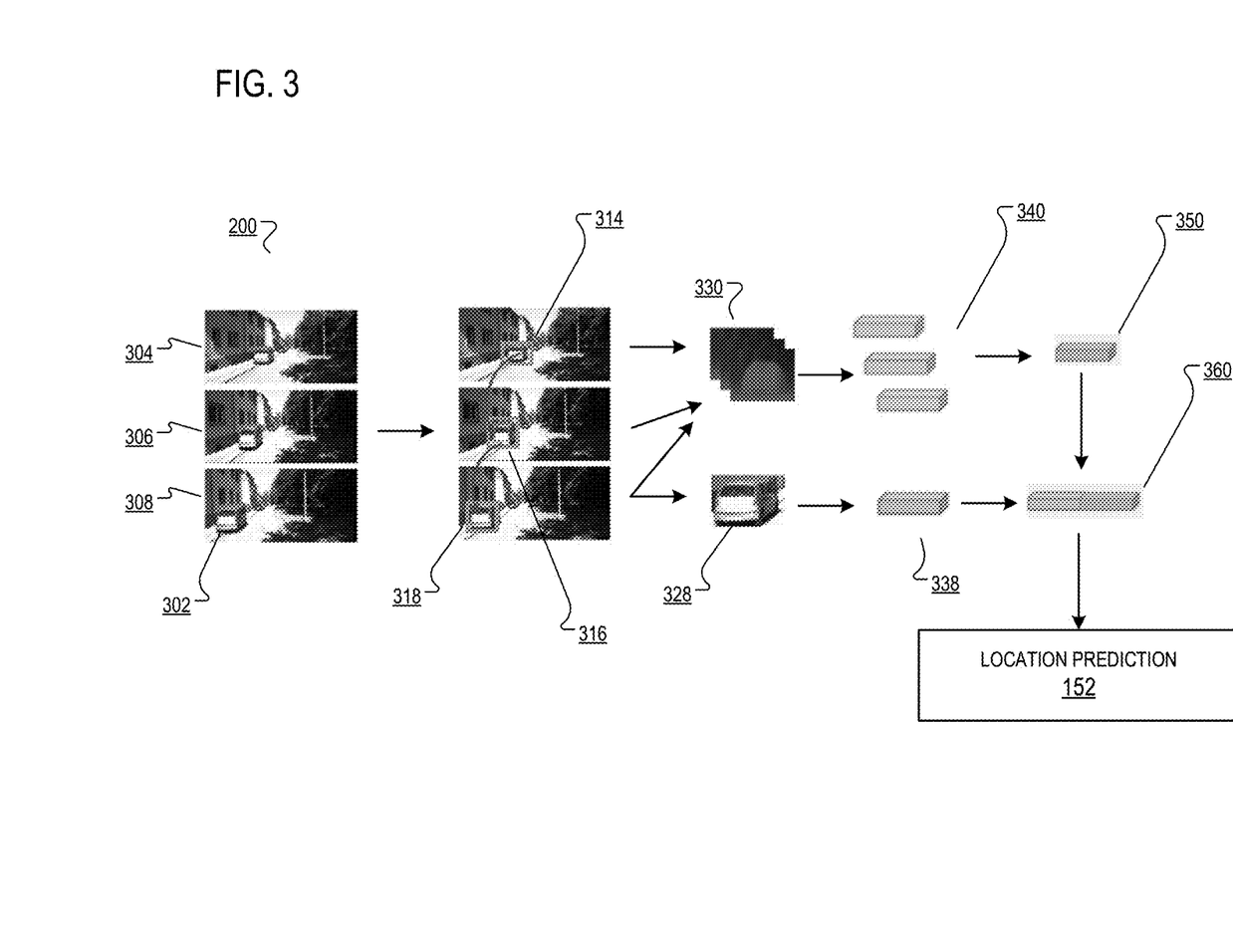
FIG. 3 shows an example of generating a location prediction for an object that is depicted in a sequence of images.

FIG. 3 shows an example of generating a location prediction 152 for an object 302 that is depicted in a sequence of images that includes three images 304, 306, and 308. The generation of the location prediction can be performed by a system of one or more computers located in one or more locations, e.g., the location prediction system 150 of FIG. 1B.

To generate the location prediction, the system applies a two-dimensional object tracker to the images 304, 306, and 308 to generate as output object tracklet data for the object 302. The object tracklet data identifies a bounding box 314 in the image 304, a bounding box 316 in the image 306, and a bounding box 318 in the image 308.

The system then generates, from the last image in the sequence, i.e., the image 318, an image patch 328 that includes only the portion of the image 318 that is within the bounding box 318.

The system also generates, for each of the bounding boxes 314, 316, and 318, a respective pseudo-lidar representation 330 that, for each bounding box, represents the pixels within the bounding box as three-dimensional points. As described above, the system can generate the pseudo-lidar representations 330 using respective initial depth estimates for each of the images 304, 306, and 308.

The system then generates image patch features 338 of the image patch 328 and pseudo-lidar features 340 of each of the pseudo-lidar representations 330.

The system then generates the location prediction 152 of the object 302 from the image patch features 338 of the image patch 328 and pseudo-lidar features 340 of each of the pseudo-lidar representations 330

In the example of FIG. 3, the system generates combined pseudo-lidar features 350 from the features 340 and then concatenates the combined pseudo-lidar features 350 and the image patch features 338 to generate combined features 360. The system then processes the combined features 360 to generate the location prediction 152.

Figure 4:
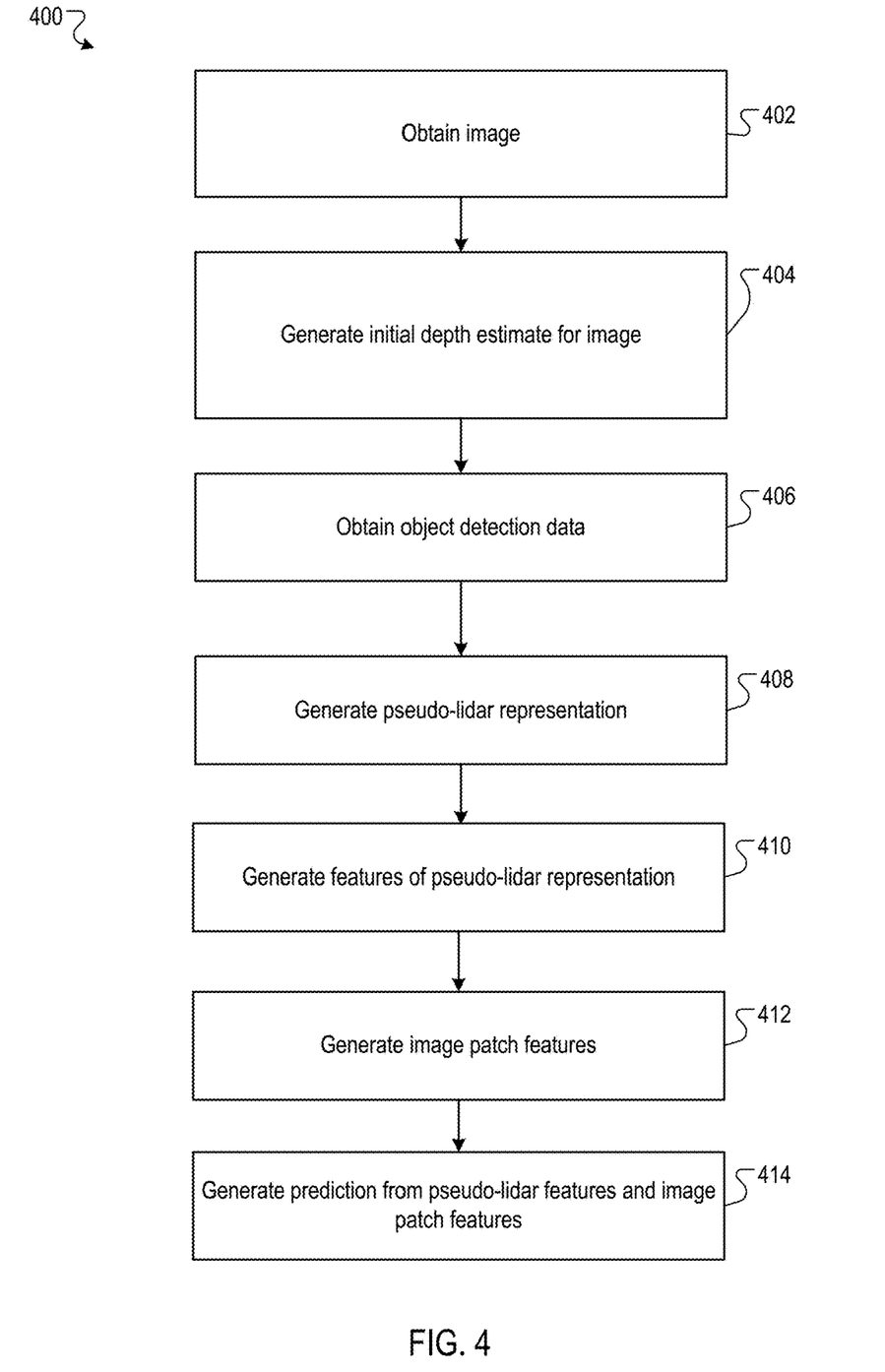
FIG. 4 is a flow diagram of another example process for generating a location prediction output.

FIG. 4 is a flow diagram of another example process 400 for generating a location prediction output for an object. For convenience, the process 400 will be described as being performed by a system of one or more computers located in one or more locations. For example, a location prediction system, e.g., the location prediction system 150 of FIG. 1B, appropriately programmed in accordance with this specification, can perform the process 400.

At any given time point, the system can perform the process 400 to generate a respective location prediction for each of one or more objects that are detected in an image that is captured by a camera sensor of the vehicle.

The system obtains an image captured by a camera sensor (step 402).

The system generates an initial depth estimate for the image (step 404). The initial depth estimate for the image assigns a respective estimated depth value to each pixel in the image. The respective estimated depth value for a given pixel represents a predicted distance of the scene depicted at that pixel from the camera that captured the image.

To generate an initial depth estimate for the image, the system can process the image using a depth estimation neural network. The depth estimation neural network can be, for example, a convolutional neural network that processes the image to generate a depth map that assigns a respective estimated depth value for each pixel of the image. In some implementations, the system obtains a pre-trained depth estimation neural network. In some other implementations, the system jointly trains the depth estimation neural network with the other neural networks that are used to generate the location predictions.

The system can then perform steps 406-412 for each of one or more objects that have been detected in the sequence of images.

The system obtains object detection data for the object (step 406). The object detection data for the object identifies a two-dimensional bounding box in the image that has been determined to depict the given object. The object detection data can be generated by applying a two-dimensional object detector as described above with reference to FIG. 1B.

The system generates a pseudo-lidar representation of the two-dimensional bounding box in the image from the initial depth estimate for the image (step 408).

The pseudo-lidar representation of a given bounding box in a given image represents each pixel that is within the bounding box in the given image as a point in a three-dimensional coordinate system. That is, the system uses the initial depth estimates to transfer the two-dimensional pixels in the given bounding box into the three-dimensional coordinate system.

In particular, to generate the pseudo-lidar representation of a given bounding box, the system maps each pixel that is within the two-dimensional bounding box to a three-dimensional coordinate system based on the estimated depth value for the pixel in the initial depth estimate for the image and properties of the camera.

As a particular example, the system can perform the mapping using the horizontal and vertical focal lengths of the camera and the pixel location corresponding to the camera center. In some implementations, the pixel value at location (u, v) in a given image is mapped to a three-dimensional point (x, y, z) in the three-dimensional coordinate system as follows:

$$z = d(u, v),$$

$$x = (u - C_x) \times z / f_x, \text{ and}$$

$$y = (v - C_y) \times z / f_y,$$

where d(u, v) is the initial depth estimate for the pixel at location (u, v), $f_x$ is the horizontal focal length, $f_y$ is the vertical focal length, and $(C_x, C_y)$ is the pixel location corresponding to the camera center.

The system generates features of the pseudo-lidar representation (step 410). For example, the system can generate the features by processing the pseudo-lidar representation using a pseudo-lidar feature extraction neural network that generates the pseudo-lidar features as output. The pseudo-lidar feature extraction neural network can be any appropriate neural network that is configured to process a collection of three-dimensional points, e.g., the encoder neural network of any appropriate 3D object detection neural network. For example, the neural network can be a convolutional neural network that arranges the points as an image and processes the image to generate the features. An example of such a neural network is a PatchNet, which is described in more detail in Ma, et al, Rethinking Pseudo-LiDAR Representation, arXiv:2008.04582.

The system generates image patch features of the two-dimensional bounding box in the image (step 412).

For example, the system can process last image using an image feature extraction neural network to generate image features for the image. The system can then select, as the image patch features, a subset of the image features that correspond to a patch of the image that is within the two-dimensional bounding box. That is, the system can generate the image patch features by cropping the portion of the image features that corresponds to the bounding box.

The system generates, from the respective pseudo-lidar features and the image patch features, a prediction that characterizes a location of the object in the three-dimensional coordinate system (step 414).

As a particular example, the system can combine the pseudo-lidar features and the image patch features to generate combined features and process the combined features using a decoder neural network to generate the prediction. In some implementations, the system generates the combined features by concatenating the pseudo-lidar features and the image patch features.

The decoder neural network can have any appropriate architecture that allows the decoder neural network to map a set of features to the prediction.

For example, the decoder neural network can be a multi-layer perceptron (MLP) neural network that processes the combined features to generate the prediction. When the prediction is a depth estimate for the object, the output of the decoder neural network can be a single regressed depth value that represents the predicted depth for the object. When the prediction specifies a three-dimensional region that corresponds to a predicted location of the object, the output of the decoder neural network can be regressed values for each of the coordinates of the three-dimensional region, e.g., the coordinates of a three-dimensional bounding box, in the three-dimensional coordinate system.

As described above, prior to using the neural networks described above, e.g., the neural networks used in performing the process 200 or the process 400, to perform inference, e.g., on-board the autonomous vehicle, a training system trains the neural networks on training data. The training data includes multiple training examples, with each training example including (i) one or more images of the environment and (ii) ground truth data for at least one of the images.

In particular, the ground truth data includes ground truth three-dimensional locations, e.g., ground truth per-object depths or ground truth three-dimensional bounding boxes, for one or more of the objects that are depicted in at least one of the images.

The system trains the neural networks described above together, i.e., jointly, to minimize an objective function that measures, for each of the one or more objects, an error between the location prediction generated by the system for the object and the ground truth location for the object. For example, when the location predictions are depth estimates, the error can be, e.g., a squared error, between the depth estimate and the ground truth depth. When the location predictions are three-dimensional bounding boxes, the error can be an error between the predicted three-dimensional bounding box and the ground truth three-dimensional bounding box, e.g., the sum of the squared errors for each of the coordinates of the bounding box.

The system can train the neural networks on the objective function using any appropriate machine learning training technique, e.g., a gradient descent technique with any appropriate optimizer, e.g., stochastic gradient descent, Adam, rmsProp, or Adafactor.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by one or more computers, the method comprising:
    obtaining a temporal sequence of images that comprises, at each of a plurality of time steps, a respective image that was captured by a camera at the time step;
    generating, for each image in the temporal sequence, respective pseudo-lidar features of a respective pseudo-lidar representation of a region in the image that has been determined to depict a first object by processing the region in the image using a first neural network, wherein the pseudo-lidar features represent one or more pixels within the region in the image as a point in a three-dimensional coordinate system based on an initial depth estimate for the image;
    generating, for a particular image at a particular time step in the temporal sequence, image patch features of the region in the particular image that has been determined to depict the first object by processing the region in the particular image using a second neural network, wherein the image patch features are generated from intensity values of pixels in the image; and
    generating, from the respective pseudo-lidar features and the image patch features, a prediction that characterizes a location of the first object in the three-dimensional coordinate system at the particular time step in the temporal sequence by processing the respective pseudo-lidar features and the image patch features using a third neural network, wherein generating, from the respective pseudo-lidar features and the image patch features, a prediction that characterizes the first object at the particular time step in the temporal sequence comprises:
        combining the respective pseudo-lidar features that represent one or more pixels within the region in the image as a point in the three-dimensional coordinate system based on the initial depth estimate for the image and the image patch features to generate combined features; and
        processing the combined features using the third neural network to generate the prediction.

2. The method of claim 1, wherein the prediction includes an updated depth estimate that estimates a depth of a specified point on the first object at the particular time step in the temporal sequence, wherein the updated depth estimate is a predicted distance from the specified point on the first object to the camera at the particular time step.

3. The method of claim 1, wherein the prediction specifies a three-dimensional region that corresponds to a predicted location of the first object at the particular time step relative to the camera.

4. The method of claim 1, wherein the third neural network is a decoder neural network.

5. The method of claim 4, wherein combining the respective pseudo-lidar features and the image patch features comprises concatenating the respective pseudo-lidar features and the image patch features.

6. The method of claim 1, wherein generating image patch features of the region in the image at the particular time step in the temporal sequence comprises:
   processing the image using an image feature extraction neural network to generate image features for the image; and
   selecting, as the image patch features, a subset of the image features that correspond to the region in the image.

7. The method of claim 1, further comprising:
   generating, for each image in the temporal sequence, an initial depth estimate that assigns a respective estimated depth value to each pixel in the image; and
   generating, for each image in the temporal sequence, the respective pseudo-lidar representation using the initial depth estimate for the image.

8. The method of claim 7, wherein generating, for each image in the temporal sequence, an initial depth estimate that assigns a respective estimated depth value to each pixel in the image comprises:
   processing the image using a depth estimation neural network to generate the initial depth estimate for the image.

9. The method of claim 8, wherein generating the pseudo-lidar representation comprises:
   mapping each pixel that is within the region in the image that has been determined to depict the first object to the three-dimensional coordinate system based on the estimated depth value for the pixel in the initial depth estimate for the image and properties of the camera.

10. The method of claim 9, wherein the properties of the camera include the horizontal and vertical focal lengths of the camera.

11. The method of claim 1, wherein generating respective pseudo-lidar features of each of the pseudo-lidar representations comprises:
   processing the pseudo-lidar representation using a pseudo-lidar feature extraction neural network to generate the pseudo-lidar features for the pseudo-lidar representation.

12. A method performed by one or more computers, the method comprising:
   obtaining a temporal sequence of images that comprises, at each of a plurality of time steps, a respective image that was captured by a camera at the time step;
   generating, for each image in the temporal sequence, an initial depth estimate that assigns a respective estimated depth value to each pixel in the image;
   obtaining object tracklet data for a first object that identifies, for each of the images in the temporal sequence, a respective two-dimensional bounding box in the image that has been determined to depict the first object;
   generating, for each image in the temporal sequence, a respective pseudo-lidar representation of the two-dimensional bounding box in the image from the initial depth estimate for the image;
   generating respective pseudo-lidar features of each of the pseudo-lidar representations by processing the pseudo-lidar representation using a first neural network, wherein the pseudo-lidar features represent one or more pixels within the region in the image as a point in the three-dimensional coordinate system based on the initial depth estimate for the image;
   generating image patch features of the two-dimensional bounding box in the last image in the temporal sequence by processing the two-dimensional bounding box in the last image using a second neural network, wherein the image patch features are generated from intensity values of pixels in the image; and
   generating, from the respective pseudo-lidar features and the image patch features, a prediction that characterizes a location of the first object in the three-dimensional coordinate system at the last time step in the temporal sequence by processing the respective pseudo-lidar features and the image patch features using a third neural network, wherein generating, from the respective pseudo-lidar features and the image patch features, a prediction that characterizes the first object at the particular time step in the temporal sequence comprises:
      combining the respective pseudo-lidar features that represent one or more pixels within the region in the image as a point in a three-dimensional coordinate system based on an initial depth estimate for the image and the image patch features to generate combined features; and
      processing the combined features using the third neural network to generate the prediction.

13. A system comprising one or more computers and one or more storage devices storing instructions then when executed by the one or more computers cause the one or more computers to perform operations comprising:
   obtaining a temporal sequence of images that comprises, at each of a plurality of time steps, a respective image that was captured by a camera at the time step;
   generating, for each image in the temporal sequence, respective pseudo-lidar features of a respective pseudo-lidar representation of a region in the image that has been determined to depict a first object by processing the region in the image using a first neural network, wherein the pseudo-lidar features represent one or more pixels within the region in the image as a point in a three-dimensional coordinate system based on an initial depth estimate for the image;
   generating, for a particular image at a particular time step in the temporal sequence, image patch features of the region in the particular image that has been determined to depict the first object by processing the region in the particular image using a second neural network; and
   generating, from the respective pseudo-lidar features and the image patch features, a prediction that characterizes a location of the first object in the three-dimensional coordinate system at the particular time step in the temporal sequence by processing the respective pseudo-lidar features and the image patch features using a third neural network, wherein generating, from the respective pseudo-lidar features and the image patch features, a prediction that characterizes the first object at the particular time step in the temporal sequence comprises:
      combining the respective pseudo-lidar features that represent one or more pixels within the region in the image as a point in the three-dimensional coordinate system based on the initial depth estimate for the image and the image patch features to generate combined features; and
      processing the combined features using the third neural network to generate the prediction.

14. The system of claim 13, wherein the prediction includes an updated depth estimate that estimates a depth of a specified point on the first object at the particular time step in the temporal sequence, wherein the updated depth estimate is a predicted distance from the specified point on the first object to the camera at the particular time step.

15. The system of claim 13, wherein the prediction specifies a three-dimensional region that corresponds to a predicted location of the first object at the particular time step relative to the camera.

16. The system of claim 13, wherein the third neural network is a decoder neural network.

17. The system of claim 16, wherein combining the respective pseudo-lidar features and the image patch features comprises concatenating the respective pseudo-lidar features and the image patch features.

18. The system of claim 13, wherein generating image patch features of the region in the image at the particular time step in the temporal sequence comprises:

processing the image using an image feature extraction neural network to generate image features for the image; and selecting, as the image patch features, a subset of the image features that correspond to the region in the image.

19. The system of claim 13, the operations further comprising:

generating, for each image in the temporal sequence, an initial depth estimate that assigns a respective estimated depth value to each pixel in the image; and generating, for each image in the temporal sequence, the respective pseudo-lidar representation using the initial depth estimate for the image.

20. The system of claim 19, wherein generating the pseudo-lidar representation of the region in the image from the initial depth estimate for the image comprises:

mapping each pixel that is within the region in the image that has been determined to depict the first object to the three-dimensional coordinate system based on the estimated depth value for the pixel in the initial depth estimate for the image and properties of the camera.

\* \* \* \* \*